April 9, 1946.  W. LEATHERS  2,398,015
VISUAL INDICATING DEVICE
Filed Feb. 21, 1945
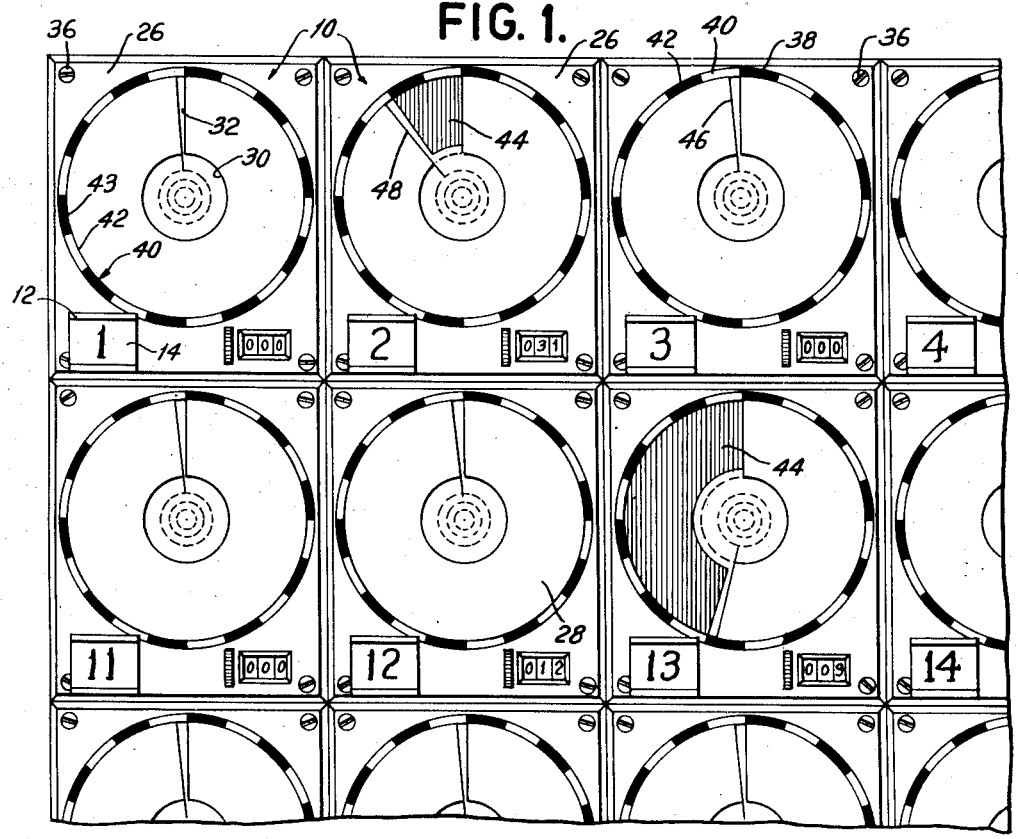
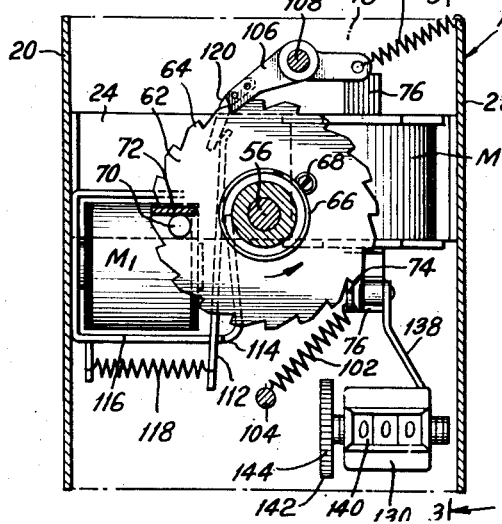
INVENTOR
WARD LEATHERS
BY
ATTORNEY Patented Apr. 9, 1946

2,398,015

UNITED STATES PATENT OFFICE 2,398,015

VISUAL INDICATING DEVICE

Ward Leathers, Brooklyn, N. Y., assignor to International Business Machines Corporation, New York, N. Y., a corporation of New York Application February 21, 1945, Serial No. 579,099

5 Claims. (Cl. 161—15)

The present invention relates to an indicating apparatus and, more particularly, to a visual indicator or monitor adapted for use in connection with commercial shop machines for rendering a visual indication of any idle time that may be encountered throughout the daily operation of the machine. According to the present invention, it is contemplated that a battery of such indicators shall be installed at a convenient place in the supervisor's office, each apparatus being electrically connected to a respective machine in the shop whose periods of idle time it is intended to indicate. Thus, the supervisor may, at any desired time, by examining the various units determine which machine or machines is or are encountering a period of idle time. According to the present invention, and purely for illustrative purposes, the apparatus has been shown with a capacity for indicating successively each minute of idle time encountered by its respective shop machine, the limit of such idle time being attained at the end of a twenty-minute period. It is to be distinctly understood, however, that the indicating apparatus may, by suitable modification, be designed for a longer or shorter period of idle time, it being considered that an indication of twenty minutes in idle time will ordinarily be sufficient for the reason that if the operator of the machine has not remedied the cause for his idle time within this period the personal attention of the supervisor may be necessary.

It is among the principal objects of the present invention to provide a visual indicator of the type set forth above having a plainly visible dial or circular ring-like indicating area which, when the particular machine with which the apparatus is associated remains in production, appears in the form of a plain white or other colored continuous and uninterrupted ring and which, when the particular machine encounters a period of idle time, presents progressive increments or sectors on the ring-like area of a contrasting color, as for example, red increments or sectors. In keeping with the above mentioned object, provision is further made whereby, as each consecutive minute of idle time terminates, the extent of the sector appearing in the ring-like area is increased a predetermined degree. The advancing of the variable contrasting sector is accomplished in step-by-step fashion so that at any particular instant of time during the idleness of the machine a proportionate sector graph is presented having two contrasting sectors, one of which represents idle time as expressed in minutes, and the other of which represents the number of minutes remaining before the machine encounters a certain limit of idle time, which limit in the present instance has been chosen as a period of twenty minutes.

Another object of the present invention is to provide an apparatus of this character which, when the period of idle time encountered by the machine terminates within the twenty-minute limit, will automatically be reset and ready to commence its indication again when any future period of idle time is encountered.

A still further object of the invention is to provide an indicator of this type which, when the full twenty-minute limit of idle time has been exceeded, will remain at its full twenty-minute indication until such time as the machine is again set into operation.

Yet another object of the invention is to provide such an indicator which is electrically operable and which employs for its operation only two relatively small electro-magnets, one magnet being employed to perform the minute stepping operation and the other magnet being employed for effecting resetting operations.

It is a still further object of the present invention to provide an indicating device which, in addition to indicating the individual periods of idle time of a machine as they are encountered, will also give a visual indication of the total minutes of idle time encountered by the machine over a predetermined period, as for example, an eight-hour shift.

The provision of an apparatus of this character which is rugged and durable and which is comprised of a minimum number of moving parts and which, consequently, is unlikely to get out of order; one which is compact in its design and which, therefore, occupies a minimum space; one which may be manufactured from relatively light steel stampings and at a relatively small cost, and one which is otherwise well adapted to perform the services required of it are further desiderata that have been borne in mind in the production and development of the present invention.

Other objects of the invention will be pointed out in the following description and claims and illustrated in the accompanying single sheet of drawings, which disclose, by way of example, the principle of the invention and the best mode, which has been contemplated, of applying that principle.

In the the drawing:

Fig. 1 is a fragmentary, front view of a battery of indicators constructed in accordance with the principles of the present invention.

Fig. 2 is a sectional view taken vertically and substantially centrally through the apparatus on a plane parallel to the plane of the dial surface.

Fig. 3 is a sectional view taken substantially along the line 3—3 of Fig. 2 in the direction indicated by the arrows.

In all of the above described views like characters of reference are employed to designate like parts throughout.

Referring now to the drawing in detail, a battery of the indicating devices is shown in Fig. 1, each individual indicating device being designated in its entirety at 10. The various devices are arranged in contiguous relationship, as shown, and each is provided with a card holder 12 suitably arranged at the front thereof, in which holders individual indicia cards 14 may be inserted, the indicia on the cards 14 each corresponding to the number of a particular shop machine with which the device is associated. Obviously, any number of such machines may be accommodated. It will be understood that the indicating device may be electrically attached to any type of machine or tool which is installed at a remote location and, where a battery of machines of a particular type are operating as a department, all of the devices may be mounted on a single board in the supervisor's office so that the latter may have at his disposal a visual indication of which machine or machines is or are encountering a period of idle time.

Each indicating device involves in its general organization a rectilinear and generally U-shaped sheet metal stamping 16 including a front wall 18 and side pieces 20 and 22. A strut or strap 24 extends across the side pieces 20 and 22 at the rear thereof, thus providing a rigid, open, box-like structure within the confines of which are disposed the operative instrumentalities of the apparatus. A substantially rectangular dial plate 26 is mounted on the front wall 18, is substantially co-extensive therewith and is provided with a plane indicating surface 28 and is formed with a circular cut-away portion 30 which communicates with a relatively narrow vertical slot 32 which extends from the peripheral edge of the cut-away portion 30 to a point adjacent but within the periphery of the surface 28. The dial plate 26 is adapted to be held in position on the front wall 18 by spacer plates 34 and anchoring screws 36, there being four of such spacer plates and anchoring screws, one adjacent each corner of the plate 26. The surface 28 of the dial plate 26 has printed or otherwise marked thereon a circular dial 38 comprising an outer narrow ring or band 40 which is divided into alternate black and white segments 42 and 43 respectively, each representing one minute of idle time encountered by the machine to which the apparatus is attached. The area existing between the inner rim of the ring 40 and the peripheral edge of the circular cut-away portion 30 serves to define a ring-like band or area, which is preferably white in color, and around which an indicating disc 44 of a contrasting color, as for example, the color red, is adapted to progressively project itself in step-by-step serpentine fashion in a manner that will be presently described.

The indicating disc 44 is in the form of a circular member having formed therein a radial slit 46 which extends inwardly from the periphery of the disc to a point adjacent the medial region thereof. The disc 44 is normally disposed immediately behind the indicating surface 28 of the dial plate 26 and has a leading edge 48 of the slit 46 overlapping one edge of the slot 32 provided in the dial plate. The indicating disc 44 is centrally mounted on a circular flange or backing plate 50 provided on a collar 52 which is pinned as at 54 to a shaft 56. It will be seen that upon step-by-step rotation of the shaft 56 and collar 52 mounted thereon in a counter-clockwise direction, as viewed in Fig. 2, a segment-like portion of the indicating disc 44 will travel around the path defined for it by the ring-like band or area on the surface 28. The optical effect of such stepping of the indicating disc 44 will be to present to the eye a segment of a color which contrasts with the white area of the surface 28 and which gradually increases in size until such time as the entire surface of the ring-like area has been obscured. As previously explained, each stepping operation serves to increase the extent of the thus presented segment by a predetermined amount which, in the present instance, since it requires twenty steps to complete the process, is 18°. The band 40, which is divided into alternate segments of a contrasting color, in the present instance black and white, serves as a reference band in order that each increment of the progressively increasing segment may be readily perceptible.

The shaft 56 projects rearwardly a slight distance through the front wall 18 and has mounted thereon a sleeve 58 which is pinned as at 60 to the shaft. A ratchet wheel 62, which is integrally formed on the sleeve 58, is provided with a series of teeth 64 on its periphery, of which there are twenty in number, the distance between each tooth corresponding to an interval of one minute. A coil spring 66 surrounds the sleeve 58, has one end thereof anchored thereto, and the other end thereof is anchored as at 68 to the front wall 18. A stop pin 70 carried by the ratchet wheel 62 is designed for engagement with a stop plate 72 formed on the front wall 18. The stop plate 72 and pin 70 are mounted on their respective supporting elements in such a manner that when the pin is in engagement with the plate no idle time will be indicated on the dial or, in other words, no portion of the indicating disc 44 will be visible beyond the confines of the slot 32. After idle time has commenced and the ratchet wheel 62 becomes progressively stepped, the stop pin 70 moves away from the stop plate 72 and if the period of idleness continues indefinitely, eventually the stop pin 70 will again come into contact with the stop plate 72 on the opposite side thereof, thus preventing any further rotation of the ratchet wheel 62.

Stepping operations are performed upon the ratchet wheel 62 by means of a pawl 74 which operates under the control of an electromagnet M. The electromagnet M is provided with a substantially U-shaped iron laminated core 76 having a center leg 77, an outside leg 78 and a cross piece 79, and which is secured in any suitable manner to the cross strap 24. The electromagnet M is provided with an armature 80 which is pivotally mounted on a short shaft 82 suspended across the lower end of a pair of straps 84 which are mounted as at 86 on the lower end of the outside leg 78 of the magnet core 76. The pawl 74 is likewise pivotally mounted on the shaft 82 but is loosely disposed on the latter in such a manner that the same may move toward and away from the armature 80 to accommodate the circular periphery of the ratchet wheel 62. The pawl 74 is provided with a short rearward extension 88 to which there is secured one end of a coil spring 90, the other end of this spring being secured to a stud 92 which passes through a bracket 94 carried by the cross piece 78 of the magnet core 76. The tendency of the coil spring 90, therefore, is to cause the pawl 74 to be swung downwardly about the axis of the shaft 82. The forward end of the pawl 74 projects through a slot 96 formed in the front wall 18 and the lowermost position of the pawl is thus limited by the lower edge of this latter slot. The armature 80 is provided with a laterally projecting pin 98 which passes through an opening 100 formed in the pawl 74 medially thereof. The diameter of the aperture 100 is slightly in excess of the diameter of the pin 98, and thus this latter pin serves as a guide member for guiding the lateral movements of the pawl 74 relative to the armature 80 and also serves as an actuating member for causing the pawl 74 to follow the vertical swinging components of movement of the armature 80. An additional coil spring 102 is connected at one end thereof to the free end of the pawl 74 and the other end of the spring is connected to a stud 104 mounted on the front wall 18 at a point below and considerably forwardly of the pawl in order to normally bias the pawl in such a direction that it will be caused to move away from the armature 80 and underlie one of the teeth provided on the periphery of the ratchet wheel 62.

From the above description of parts it will be seen that upon energization of the magnet M the armature 80 will be attracted toward the center leg 77 of the core 76, thus causing the armature to swing upwardly about the pivotal axis of the short shaft 82. During such upward swinging movement of the armature 80, the pawl 74 will, by virtue of its pin and aperture connection 98, 100, with the armature be likewise swung upwardly about the axis of the shaft 82. In so moving upwardly, the free or outer end of the pawl 74 will carry with it the particular tooth on the periphery of the ratchet wheel 62 which it underlies, and in so moving the pawl will be caused to move laterally toward the armature 80. Immediately upon deenergization of the magnet M, the armature 80 and pawl 74, acting under the influence of the springs 90 and 102, will be moved downwardly and restored to their initial normal position. To prevent return movement of the ratchet wheel 62 during such downward movement of the armature 80 and pawl 74, a holding pawl 106 is pivotally mounted on a stud 108 on the front wall 18 and is spring-biased by means of a tension spring 110 in such a manner that its operative end will at all times engage the periphery of the ratchet wheel 62.

It will be appreciated that because of the fact that there are twenty teeth 64 on the periphery of the ratchet wheel 62, each indexing operation of this latter wheel will cause the leading edge of the indicating disc 44 to progress in the path provided for it throughout an angle of 18°. Inasmuch as impulses are received at regular intervals of one minute during the time that the machine under the control of the recording apparatus remains idle, stepping operations may be successively continued until such a time as the indicating disc 44 has made one complete revolution and is visible substantially in its entirety in front of the dial plate 26. Means are provided whereby at the termination of a period of idle time, the indicating disc 44 may be restored to its initial and concealed position behind the dial plate 26.

Toward this end, a reset magnet M1 is suitably secured to the side piece 20 and is provided with an armature 112 which is pivoted as at 114 to a magnet housing 116 and which is spring-pressed as at 118 in such a manner as to hold the armature in a retracted position. The front end of the armature 112 projects upwardly to a point immediately behind an extension 120 carried by the pawl 106, the arrangement being such that upon energization of the magnet M1 and consequent attraction of the armature 112, the upper end of the latter will engage the extension 120 to cause the holding pawl 106 to be moved out of the path of movement of the teeth 64 provided on the periphery of the ratchet wheel 62, the ratchet wheel 62 being normally biased by the coil spring 66 to its initial position wherein the indicating disc 44 remains concealed. Such removal of the pawl 106 from the path of movement of the teeth 64 on the ratchet wheel 62 will automatically cause resetting operations to take place.

A total indicator 130 is suitably mounted in an aperture 132 provided in the front wall 18 and its counter indication is visible through a window 134 formed in the dial plate 26. This indicator 130 is of conventional design and is provided with an operating lever 136 which is pivotally connected at its free end to one end of a link 138, the other end of the link being pivotally connected to the pawl 74 medially of its ends. The total indicator 130 is so designed that upon each repetition of its operating lever 136 its indicating counters 140 will be indexed one unit. The indicator 130 is provided with a reset knob 142 which projects through a slot 144 formed in the dial plate 26 and is thus accessible for manipulation.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In an indicator for progressively indicating predetermined increments of time, a dial plate having a circular dial face thereon, there being a radial slot formed in said plate and extending from the medial regions of the dial face to the peripheral regions thereof, a circular indicating disc positioned behind said dial plate and having a radial slit formed therein extending from the medial regions of the disc to the periphery thereof, a leading edge of said slit normally overlapping one edge of the slot, and means for progressively rotating said plate and disc relative to each other.

2. In an indicator for progressively indicating predetermined increments of time, a stationary dial plate having a circular dial face thereon, there being a radial slot formed in said plate and extending from the medial regions of the dial face to the peripheral regions thereof, a circular indicating disc positioned behind said dial plate and having a radial slit formed therein extending from the medial regions of the disc to the periphery thereof, a leading edge of said slit normally overlapping one edge of the slot, and means for rotating said circular disc about the axis of the dial face.

3. In an indicator for progressively indicating predetermined increments of time, a stationary dial plate having a circular dial face thereon, there being a radial slot formed in said plate and extending from a point in the medial regions of the dial face and offset from the center thereof to a point in the peripheral regions and within the extreme periphery thereof, a circular indicating disc positioned behind said dial plate and mounted for rotation about the axis of the dial face, said disc having a radial slit formed therein extending from a point within the medial regions and offset from the center of the disc to the extreme periphery thereof, a leading edge of said slit normally overlapping one edge of the slot, and means for progressively rotating said disc in step-by-step fashion.

4. In an indicator for progressively indicating predetermined increments of time, a dial plate having a circular dial face thereon, there being a circular hole extending through said plate and concentric with the dial face, there being a radial slot formed in said plate communicating with the hole and extending to a point in the peripheral regions of the dial face and within the extreme periphery of the latter, a circular indicating disc positioned behind said dial plate concentric with the dial face, there being a radial slit formed in said disc and extending from a point adjacent the edge of said hole to the periphery of the disc, a leading edge of said slit normally overlapping one edge of said slot, and means for rotating said disc in step-by-step fashion about the axis of said dial face.

5. In an indicator for progressively indicating predetermined increments of time, a dial plate having a circular dial face thereon, there being a circular hole extending through said plate and concentric with the dial face, there being a radial slot formed in said plate communicating with the hole and extending to a point in the peripheral regions of the dial face and within the extreme periphery of the latter, a circular indicating disc positioned behind said dial plate concentric with the dial face, there being a radial slit formed in said disc and extending from a point adjacent the edge of said hole to the periphery of the disc, a leading edge of said slit normally overlapping one edge of said slot, and means for rotating said disc in step-by-step fashion about the axis of said dial face, the surface of said dial face being of one color, the area of said disc concentric with said hole being of a contrasting color, and the remainder of said disc being of a color which contrasts with both of the other colors.

WARD LEATHERS.